Aug. 27, 1968  D. YANNASCOLI  3,398,551
COMPRESSOR CONTROL INCLUDING PRESSURE
EQUALIZER AND OVERPRESSURE MEANS
Filed Oct. 3, 1966
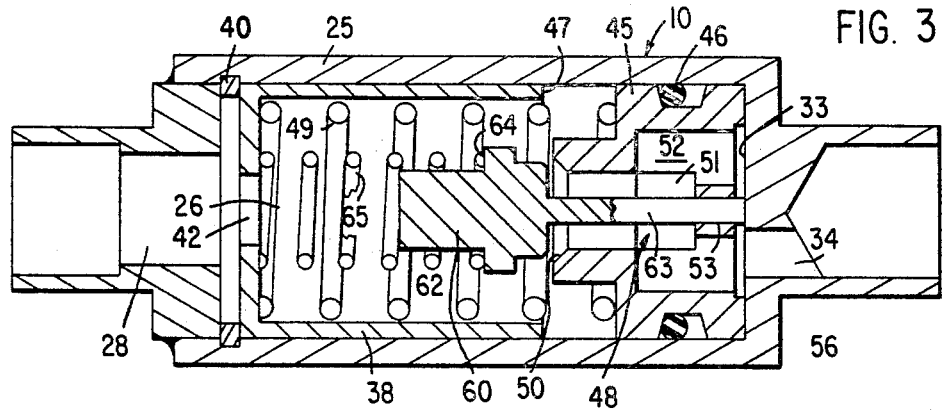
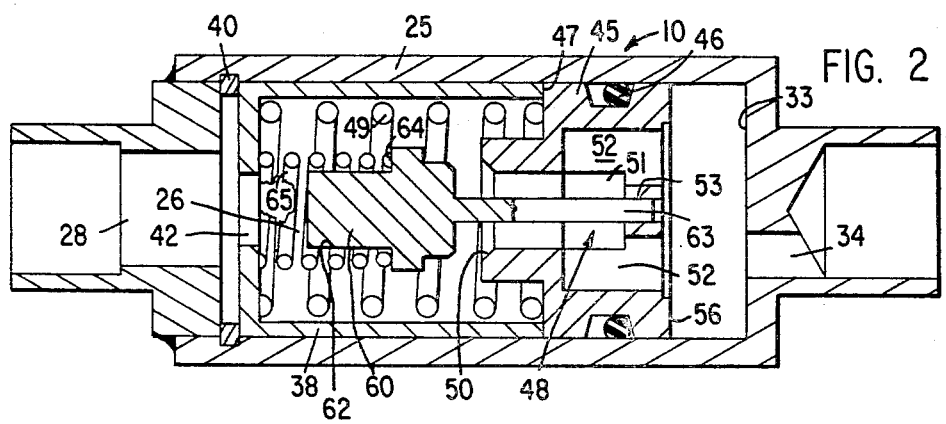
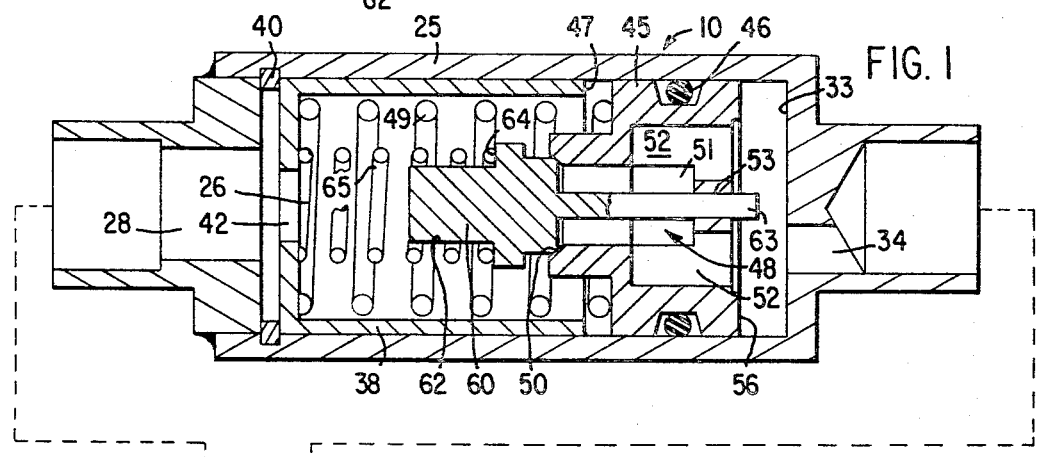
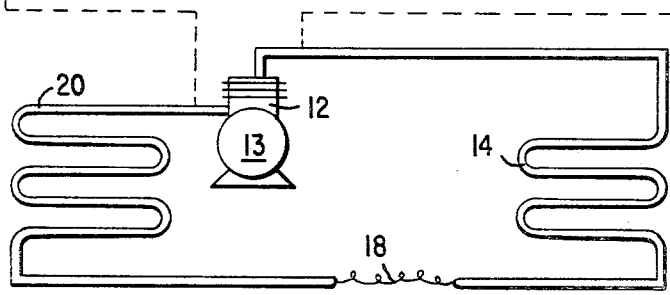
INVENTOR.
DONALD YANNASCOLI.
BY Frederick E. McMullen
ATTORNEY.

United States Patent Office 3,398,551
Patented Aug. 27, 1968

3,398,551
COMPRESSOR CONTROL INCLUDING PRESSURE EQUALIZER AND OVERPRESSURE MEANS
Donald Yannascoli, Syracuse, N.Y., assignor to Carrier Corporation, Syracuse, N.Y., a corporation of Delaware
Filed Oct. 3, 1966, Ser. No. 583,759
8 Claims. (Cl. 62—196)

This invention relates to fluid compressors and more particularly to a combined pressure equalizer and overpressure control for use with fluid compressors.

In systems employing fluid compressors, such as refrigeration systems, following shutdown of the compressor and normally for a number of hours thereafter, a substantial pressure differential remains across the compressor which the compressor motor must overcome along with the inertia of the compressor parts to restart the compressor. Since the user cannot be required to wait that long, the starting power of the compressor motor must be boosted through the use of an extra cost starting accessory, or an oversized motor must be used. And, even with starting accessories or oversized motors, a substantial period of time must still elapse before the compressor can be restarted.

It is a principal object of the present invention to provide a new and improved pressure control for use with fluid compressors.

It is a further object of the present invention to provide a pressure equalizing mechanism for use with fluid compressors to reduce starting load on the compressor driving unit.

It is an object of the present invention to provide a mechanism adapted to quickly equalize pressures across a fluid compressor following stoppage thereof to facilitate restarting of the compressor without the necessity for motor starting accessories or oversized motors.

It is an object of the present invention to provide an improved overpressure protector for fluid compressors.

This invention relates to a combination equalizer and overpressure control for use with fluid compressors comprising means forming a passage adapted to conduct pressure fluid, the passage forming means including a piston like member having a relief port therethrough; means for closing the relief port including a second piston like member, the first and second members being movable relative to one another; and control means including first pressure sensitive means urging the second member into sealing abutment with the first member to hold the relief port closed, the first pressure sensitive means being adapted at a predetermined overpressure condition to permit separating movement between the first and second members to open the relief port and reduce pressures across the control, the first and second members being capable of joint movement; second pressure sensitive means cooperable with the first pressure sensitive means at a predetermined second pressure condition to jointly move the first and second members; and means adapted following predetermined joint movement of the first and second members to retard the second member so that continued movement of the first member separates the first member from the second member to uncover the relief port to relatively quickly equalize pressures across the control.

Other objects and advantages of the invention will be apparent from the ensuing description and drawings in which:

FIGURE 1 is a schematic view showing the combination pressure equalizer and overpressure control of the present invention as used with a fluid compressor;

FIGURE 2 is a schematic view of the control of FIGURE 1 showing the control at a compressor overpressure condition; and FIGURE 3 is a schematic view showing the control of FIGURE 1 following shutdown of the compressor.

Referring to FIGURE 1 of the drawings, there is shown a pressure control 10 of the present invention as used with a fluid compressor 12. As will be more apparent hereinafter, pressure control 10 equalizes pressures across compressor 12 following shutdown of the compressor and protects the compressor against excessive internal pressures.

In the exemplary showing of the drawing, fluid compressor 12 forms part of a closed fluid pressure system, more particularly a refrigeration system having condenser 14, capillary 18, and evaporator 20. In this type of system, it is understood that the relatively high pressure vaporous refrigerant discharged by compressor 12 is condensed by condenser 14, the liquid refrigerant leaving condenser 14 being expanded by capillary 18 and thereafter flowing to evaporator 20 where the refrigerant is vaporized. Gaseous refrigerant from evaporator 20 returns through a conduit to compressor 12.

On shutdown of compressor 12 a substantial pressure differential exists across the compressor. Although a part of the pressure differential across the compressor is relatively quickly dissipated through the fluid system, the ability of the system to dissipate pressures is limited, and several hours' time may be required before the compressor can be restarted. Where compressor motor 13 is a single-phase motor, a starting package is added to enable motor 13 to overcome the pressure loading on compressor 12 after several minutes shutdown. Where motor 13 is a three-phase motor, the starting system necessary for that type motor provides adequate starting torque if the motor is of adequate size. The cost advantage in eliminating starting packages and reducing motor size are evident, and pressure control 10, which effectively neutralizes pressure loading on a compressor in a relatively short time following shutdown of the compressor eliminates the need for motor starting accessories and/or oversized motors.

Pressure control 10 has an outer shell 25 forming a generally cylindrical valve and piston chamber 26. One side 28 of chamber 26 is adapted to be connected to the inlet or suction side of compressor 12. The opposite end of chamber 26 communicates via opening 34 with the outlet or discharge side of compressor 12. Preferably, pressure control 10 is located within the compressor shell avoiding the need for external lines. Opening 34 is preferably offset relative to chamber 26.

Generally cylindrical member 38 is arranged within chamber 26. Stop 40 prevents outward movement of member 38 from shell 25. A passage 42 is provided in member 38.

A piston 45 having suitable O-ring sealing means 46 about the periphery thereof is slidably arranged in chamber 26. End wall 33 of chamber 26 and end 47 of member 38 limit the stroke of piston 45. Spring 49, disposed between member 38 and piston 45, urges piston 45 toward wall 33 of chamber 26.

Piston 45 has a pressure relief port 48 therethrough comprised of interconnected passages 51, 52. The axes of passages 52 are spaced from the axis of piston 45, while passage 51 is coaxial with passage 42. Piston 45 is bevelled at 50 to form a valve seat. A coaxial bearing opening 53 is provided in piston 45 for slidably journaling stem 63 of relief valve 60 as will be more apparent hereinafter.

Relief valve 60 comprises a generally cylindrical part having a stem-like projection 63. Stem 63 of valve 60 is slidably journaled in bearing opening 53 of piston 45. Stem 63 is slightly longer than piston 45, and when relief valve 60 engages seat 50, the end of stem 63 projects slightly beyond the rear face 56 of piston 45.

The outer periphery of relief valve 60 is reduced at 62 forming spring stop 64. Spring 65, arranged between member 38 and stop 64, urges relief valve 60 toward piston 45.

Spring 49 is selected to cause piston 45 to abut wall 33 of chamber 26 following a predetermined decrease in the pressure differential measured by pressure control 10. Spring 65 is selected to separate relief valve 60 from piston 45 and open relief port 48 at a predetermined high pressure differential as measured by control 10.

With compressor 12 shutdown and assuming the pressures between the compressor inlet and outlet to be substantially equal, spring 49 holds piston 45 against wall 33 of the control chamber 26. Spring 65 biases stem 63 of relief valve 60 against the wall 33. Inasmuch as relief valve stem 63 is longer than piston 45, relief valve 60 is unseated and port 48 is opened. This is a position shown in FIGURE 3 of the drawings.

When compressor 12 is started, the difference in pressure between inlet and outlet of the compressor 12 rises. At a predetermined pressure differential, pressure on piston 45 overcomes spring 49 to move piston 45 away from wall 33 of chamber 26 toward member 38. With relief valve 60 stationary, seat 50 engages valve 60 closing relief port 48. On closure of relief port 48, the pressure differential across the piston-relief valve assembly rapidly increases and piston 45, carrying relief valve 60 therewith, is forced toward retainer 38 against the combined bias springs 49, 65. During normal compressor operation, the piston-relief valve assembly approaches but does not engage member 38 as shown in FIGURE 1 of the drawings.

With relief port 48 closed by valve 60, a rise in pressure above the normal compressor operating pressure is reflected in control 10 and at a predetermined overpressure, relief valve 60 opens to permit high pressure fluid to flow through port 48 directly to the compressor inlet as shown in FIGURE 2 of the drawings. Spring 65 closes relief valve 60 to interrupt relief port 48 when system pressures return to normal.

When compressor 12 is shut down, the existing pressure differential across compressor 12 undergoes an initial, rapid decrease as pressures are dissipated by the fluid system. Following this initial decrease in pressure differential across compressor 12, the rate of decrease of the pressure differential across the compressor slows markedly. Springs 49, 65 provide a combined bias which, at a pressure condition representing the slow up in the rate of pressure equalization, moves the piston-relief valve assembly in unison toward end wall 33 of chamber 26. As the piston-relief valve assembly nears wall 33, stem 63 of valve 60 engages wall 33 and further movement of relief valve 60 in that direction is prevented. Continued movement of piston 45 toward wall 33, in response to the continuing decrease in pressure differential across compressor 12, separates piston 45 from valve 60, opening relief port 48 and quickly and completely equalizing pressures across compressor 12.

The present pressure control not only safeguards the fluid compressor from excessive internal pressures but equalizes pressures across the system compressor on shutdown thereof. The latter is accomplished through the use of the system itself to effect an initial albeit incomplete reduction of the pressure differential existing across the compressor and by thereafter directly communicating the outlet of the compressor with the inlet.

While I have described a preferred embodiment of my invention, it will be understood that the invention is not limited thereto since it may be otherwise embodied within the scope of the following claims.

I claim:
1. A combination equalizer and overpressure control for use with fluid compressors comprising: means forming a passage adapted to conduct pressure fluid, said passage forming means including a piston like member having a relief port therethrough; means for closing said relief port including a second piston like member, said first and second members being movable relative to one another; and control means including first pressure sensitive means urging said second member into sealing abutment with said first member to hold said relief port closed, said first pressure sensitive means being adapted at a predetermined overpressure condition to permit separating movement between said first and second members to open said relief port and reduce pressures across said control; said first and second members being capable of joint movement; second pressure sensitive means cooperable with said first pressure sensitive means at a predetermined second pressure condition to jointly move said first and second members; and means adapted following predetermined joint movement of said first and second members to retard said second member so that continued movement of said first member separates said first member from said second member to uncover said relief port to relatively quickly equalize pressures across said control.

2. The control according to claim 1 in which said passage forming means includes a body having a piston chamber therein; said first and second members being movably disposed in said chamber and cooperating to close said chamber to the flow of pressure fluid therethrough.

3. A control according to claim 1 in which said retarding means comprises an abutment engageable with said second member following predetermined movement of said second member.

4. A control according to claim 1 in which said first pressure sensitive means comprises a control spring engaging said second member in opposition to pressures on said second member; said second pressure sensitive means comprising a second control spring engaging said first member in opposition to pressures on said first member, said first spring acting through said second member to supplement the force of said second spring.

5. In a refrigeration system including a compressor with a first heat exchange coil joined to the discharge side of said compressor, expansion means, and a second heat exchange coil joined to the suction side of said compressor, the combination of, relief passage forming means adapted to communicate said compressor discharge side with said compressor suction side bypassing said system, and control means for said passage means responsive to pressure differences between said compressor discharge and suction sides and adapted at one of a predetermined overpressure condition or a predetermined low pressure condition to open said passage means.

6. A refrigeration system according to claim 5 in which said control means includes a movable piston type closure for said passage means, and means adapted at said predetermined overpressure condition to permit said closure to open.

7. A refrigeration system according to claim 6 in which said relief passage forming means includes a movable wall section, said piston like closure being adapted to abut one end of said wall section to close said passage means, means adapted at said predetermined low pressure condition to move said wall section and said closure in unison, and stop means engageable with said closure following preset movement thereof to prevent further movement of said closure so that continued movement of said wall section separates said wall section from said closure to open said passage means.

8. A refrigeration system according to claim 7 in which said overpressure condition responsive means comprises a first control spring engageable with said closure to urge said closure into engagement with said wall section, said low pressure responsive means comprising a second control spring engageable with said wall section and cooperable with said first control spring to oppose discharge pressures on said wall section.

References Cited
UNITED STATES PATENTS

| | | |
|---|---|---|
| 2,193,244 | 3/1940 | Wolcott. |
| 2,579,439 | 12/1951 | Noe _____ 62—196 XR |
| 2,804,881 | 9/1957 | Seid _____ 137—508 XR |

MEYER PERLIN, *Primary Examiner.*